(12) United States Patent
Tamatsu et al.

(10) Patent No.: US 6,693,583 B2
(45) Date of Patent: Feb. 17, 2004

(54) OBJECT RECOGNITION APPARATUS AND METHOD THEREOF

(75) Inventors: Yukimasa Tamatsu, Okazaki (JP); Hiroaki Kumon, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/387,553

(22) Filed: Mar. 14, 2003

(65) Prior Publication Data

US 2003/0179129 A1 Sep. 25, 2003

(30) Foreign Application Priority Data

Mar. 19, 2002 (JP) ........................................ 2002-076196

(51) Int. Cl.$^7$ .......................... G01S 13/00; B60T 7/16; B62D 1/24; G01C 21/26; G01C 21/28
(52) U.S. Cl. ........................ 342/70; 180/167; 180/168; 180/169; 701/223
(58) Field of Search ............. 342/70, 71; 180/167–169; 340/435–6, 992; 701/96, 223, 301

(56) References Cited

U.S. PATENT DOCUMENTS

| | | | | | |
|---|---|---|---|---|---|
| 4,011,563 A | * | 3/1977 | Robbi | .................. | 342/128 |
| 5,530,447 A | * | 6/1996 | Henderson et al. | ........... | 342/70 |
| 6,069,581 A | * | 5/2000 | Bell et al. | .................. | 342/70 |
| 6,184,782 B1 | * | 2/2001 | Oda et al. | .................. | 340/435 |
| 6,323,802 B1 | | 11/2001 | Tokoro | | |
| 6,377,167 B1 | * | 4/2002 | Juds et al. | .................. | 340/435 |
| 6,509,863 B2 | * | 1/2003 | Zoratti et al. | .............. | 342/70 |
| 6,542,111 B1 | * | 4/2003 | Wilson | .................. | 342/70 |

FOREIGN PATENT DOCUMENTS

| | | |
|---|---|---|
| JP | 11-344560 | 12/1999 |
| JP | 2000-147115 | 5/2000 |
| JP | 2001-116839 | 4/2001 |

\* cited by examiner

*Primary Examiner*—Thomas H. Tarcza
*Assistant Examiner*—Brian Andrea
(74) *Attorney, Agent, or Firm*—Posz & Bethards, PLC

(57) ABSTRACT

The invention provides an object recognition apparatus that removes virtual images without detecting a roadside object. When a predetermined vehicle is currently running on a lane, a detection area, outside of the currently running lane, is designated to include a first area and an assumed ghost area therein. The first area is enclosed by a boundary of the detection area, a boundary of the assumed ghost area adjacent thereto, and a boundary on the currently running lane whose distance is traveled by the vehicle during one control cycle. The invention detects an object for the first time in the assumed ghost area, not in the first area. When the object travels with a distance and a speed of a target vehicle, it is determined to be a ghost to be deleted.

14 Claims, 11 Drawing Sheets

OBJECT RECOGNITION APPARATUS AND METHOD THEREOF

BACKGROUND OF THE INVENTION

1. Field of the Invention

The invention relates to an object recognition apparatus and method thereof and a radar apparatus and method thereof that recognize an object in front of a predetermined vehicle, and more particularly to an object recognition apparatus and method thereof and a radar apparatus and method thereof, which prevent misrecognition of virtual images produced by reflection of roadside objects.

2. Description of the Related Art

FIG. 1 is a diagram for illustrating how a ghost is detected by a radar apparatus in the prior art. In the past, a radar apparatus is known that transmits radar waves to an object ahead and, using waves reflected by the object, measures a distance and a relative velocity to the object. The radar apparatus on a predetermined vehicle 100, as shown in FIG. 1, is able to make a correct recognition of a distance and a relative velocity of a target vehicle 200 when it directly receives waves reflected by the target vehicle 200 ahead (a route ① shown in FIG. 1). However, when there exists a roadside object 300 such as a guard rail, tunnel wall, or windbreak wall, and the waves from the target vehicle 200 are reflected by the roadside object 300 (a route from ② to ③ shown in FIG. 1), the radar apparatus makes an erroneous recognition as if the waves were reflected outside of the roadside object 300 (a route from ②' to ③ shown in FIG. 1), and detects a virtual image of a vehicle that is not really existent, that is, a ghost 210. This gives rise to a problem.

As one technique to overcome the problem, there is Japanese Patent Application Laid-open No. 2001-116839. The Japanese Application discloses an invention by which a line having a width of three lanes around a lane on which a vehicle is currently running is designated as a basic line. When three of a series of stationary objects, for example, projectors (reflectors) continuously put on guardrails, are detected inside of the basic line, a new line consisting of a series of projectors is produced as a new basic line. When there exists an object outside of the basic line, the object is decided to be a ghost, which is to be deleted.

The radar apparatus in the prior art may sometimes fail to recognize the roadside object 300. A frequency modulated continuous wave (FMCW) radar apparatus, for example, receives reflected waves, but cannot know from where in the roadside object 300 the received waves are reflected when the roadside object 300 does not have a series of projectors. As a result, a combination of FFT power spectral peaks cannot be determined, which fails to recognize the roadside object 300.

In the technique disclosed in Japanese Patent Application Laid-open No. 2001-116839, when the roadside object 300 is not recognized, the ghost 210 may sometimes be erroneously detected. For example, when a vehicle is running on a lane having the roadside object 300 and two or more of a series of projectors cannot be detected, a line having a width of three lanes is designated as a basic line. Since the ghost 210 produced outside of the roadside object 300 are present inside of the basic line, it is recognized erroneously as a correct target, which is a problem.

As mentioned above, since the radar apparatus in the prior art gives rise to the problems, there is a need to resolve the problem.

SUMMARY OF THE INVENTION

The invention is directed to an apparatus and method that satisfy the need. The invention provides an object recognition apparatus and method thereof and a radar apparatus and method thereof that can recognize a virtual image without detecting a roadside object. The radar apparatus uses radar waves for detection of an object, while the object recognition apparatus and method thereof are related to lasers and infrareds for detection of an object.

One aspect of the invention involves an object recognition apparatus. The apparatus comprises a judgment unit for judging whether an object is detected on a lane other than a lane on which a predetermined vehicle is currently running, an adjacent lane judgment unit for judging whether an adjacent lane exists adjacent to the currently running lane, and a recognition unit for recognizing that the object is a virtual image when the judgment unit has judged that the object is detected and the adjacent lane judgment unit has judged that the adjacent lane does not exist.

According to the invention, although the adjacent lane does not exist, when the object like a vehicle on a lane other than the currently running lane, for example, a lane adjacent to the currently running lane is detected, it is judged that the object is a virtual image.

Though there is no adjacent lane adjacent to the currently running lane, when the object like a vehicle is detected adjacent to the currently running lane, the invention judges that the object is a virtual image Advantageously, the adjacent lane judgment unit designates a first area where a vehicle running on the adjacent lane at a predetermined relative speed with respect to the predetermined vehicle is detected at least once, and a second area that is outside of the currently running lane and does not overlap the first area, and when the object is detected for the first time in the second area, not in the first area, judges that the adjacent lane is not existent.

Since the first area is designated as an area where a vehicle running on the adjacent lane at a predetermined relative speed with respect to the predetermined vehicle is detected at least once, when there is an adjacent lane, the object is usually detected in the first area. Accordingly, when the object is detected for the first time in the second area, not in the first area, it is judged that the adjacent lane is not existent, and that the object is a virtual image.

When a vehicle on the adjacent lane is running at a speed more than a predetermined relative speed, since the vehicle can be detected for the first time in the second area, not in the first area, the vehicle is erroneously judged to be a virtual image.

Advantageously, when a first object has been detected in the second area for the first time, not detected in the first area, but a second object having the same distance and relative speed as the first object has not been detected on the currently running lane, the recognition unit does not recognize the first object as a virtual image. The recognition can be done because when a virtual image is produced, there always exists on the currently running lane an object that has the same distance and relative speed as a virtual image. The recognition leads to more precise judgment as to whether or not the object is the virtual image.

Advantageously, the apparatus further comprises a stationary object line judgment unit for judging whether a stationary object line is detected having a plurality of stationary objects, wherein when the stationary object line judgment unit has judged that the stationary object line is detected, the recognition unit recognizes as a virtual image an object detected outside of the stationary object line. As a result, a erroneous recognition of virtual images can be prevented.

Advantageously, when a virtual image is detected outside of the stationary object line, but a vehicle ahead is not detected that runs on the currently running lane at the same distance and relative speed as the virtual image, the recognition unit estimates a distance and a relative velocity of the vehicle ahead based on the virtual image.

Advantageously, the recognition unit estimates a distance and a relative velocity of the virtual image as the distance and the relative velocity of the vehicle ahead.

Advantageously, the recognition unit designates an area, based on the distance and the relative velocity of the virtual image, where the vehicle ahead is estimated to exits in the past, and, when the vehicle ahead is detected in the designated area, estimates a distance and a relative velocity of the vehicle ahead during a present control cycle, based on the distance and the relative velocity of the vehicle ahead detected in the past.

As mentioned above, a virtual image is recognized outside of the stationary object line, it is presumed that there is a vehicle ahead on the currently running lane that runs at the same distance and relative velocity as those of the virtual image. However, thought a virtual image is recognized outside of the stationary object line, when a vehicle ahead, which produces, is not detected on the currently running lane, it is considered that the vehicle ahead on the currently running lane is lost. Accordingly, based on the virtual image recognized outside of the stationary object line, the lost vehicle ahead is extrapolated, which enables the object on the currently running lane to be precisely recognized without being lost.

One aspect of the invention involves a radar apparatus for use on a vehicle. The apparatus comprises a transmitter for transmitting waves to an object ahead, a receiver for receiving the waves reflected by the object, a judgment unit, based on a signal from the receiver, for judging whether the object is detected on a lane other than a lane on which the vehicle is currently running, an adjacent lane judgment unit for judging whether an adjacent lane exists adjacent to the currently running lane, and a recognition unit for recognizing that the object is a virtual image when the judgment unit has judged that the object is detected and the adjacent lane judgment unit has judged that an adjacent lane does not exist. The radar apparatus has the same advantages as the object recognition apparatus does.

One aspect of the invention involves a method of recognizing an object. The method comprises judging whether an object is detected on a lane other than a lane on which a vehicle is currently running judging whether an adjacent lane exists adjacent to the currently running lane, and recognizing that the object is a virtual image when the object is detected and the adjacent lane does not exist.

One aspect of the invention involves a method of recognizing an object by the use of a radar apparatus on a vehicle. The method comprises transmitting waves to an object ahead, receiving the waves reflected by the object, based on a signal from the receiver, judging whether the object is detected on a lane other than a lane on which the vehicle is currently running, judging whether an adjacent lane exists adjacent to the currently running lane, and recognizing that the object is a virtual image when the judgment unit has judged that the object is detected and the adjacent lane judgment unit has judged that an adjacent lane does not exist.

One aspect of the invention involves a method of recognizing an object by the use of a radar apparatus on a vehicle that can detect a range of velocities and have a detection period. The method comprises establishing a detection area in a traveling direction of the vehicle that is currently running on a lane, for detecting an object by radar waves of the radar apparatus, establishing a first area within the detection area on an adjacent lane adjacent to the currently running lane, the first area designated by a distance decided by a maximum velocity of the detection range and the detection period, establishing a second area within the detection area, not overlapping the first area, and detecting the object for the first time in the second area, not in the first area, whereby the object is judged to be a ghost.

Advantageously, the distance is decided by multiplying the maximum velocity of the detection range by the detection period.

One aspect of the invention involves a method of recognizing an object by the use of a radar apparatus on a vehicle that can detect a range of velocities and have a detection period. The method comprises establishing a detection area in a traveling direction of the vehicle that is currently running on a lane, for detecting an object by radar waves of the radar apparatus, establishing a first area within the detection area on an adjacent lane adjacent to the currently running lane, the first area designated by a distance decided by a maximum velocity of the detection range and the detection period, establishing a second area within the detection area, not overlapping the first area, detecting the object for the first time in the second area, not in the first area, and detecting a target vehicle that runs at the same distance and relative velocity of those of the object, whereby the object is judged to be a ghost.

Advantageously, the distance is decided by multiplying the maximum velocity of the detection range by the detection period.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

DETAILED DESCRIPTION OF THE PREFERRED EMBODIMENTS

Figure 1:
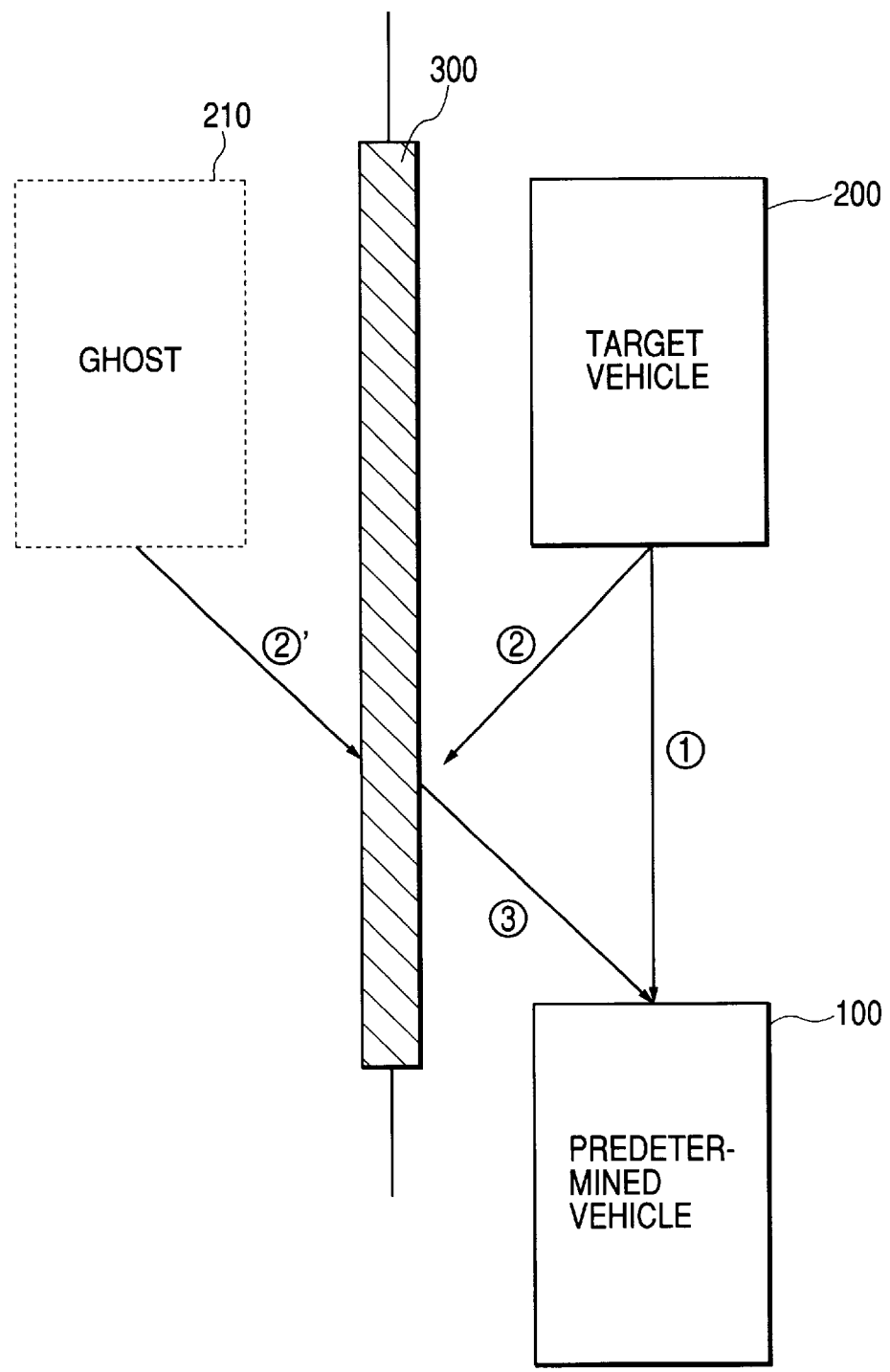
FIG. 1 is a diagram for illustrating how a ghost is detected by a radar apparatus in the prior art.
Figure 2:
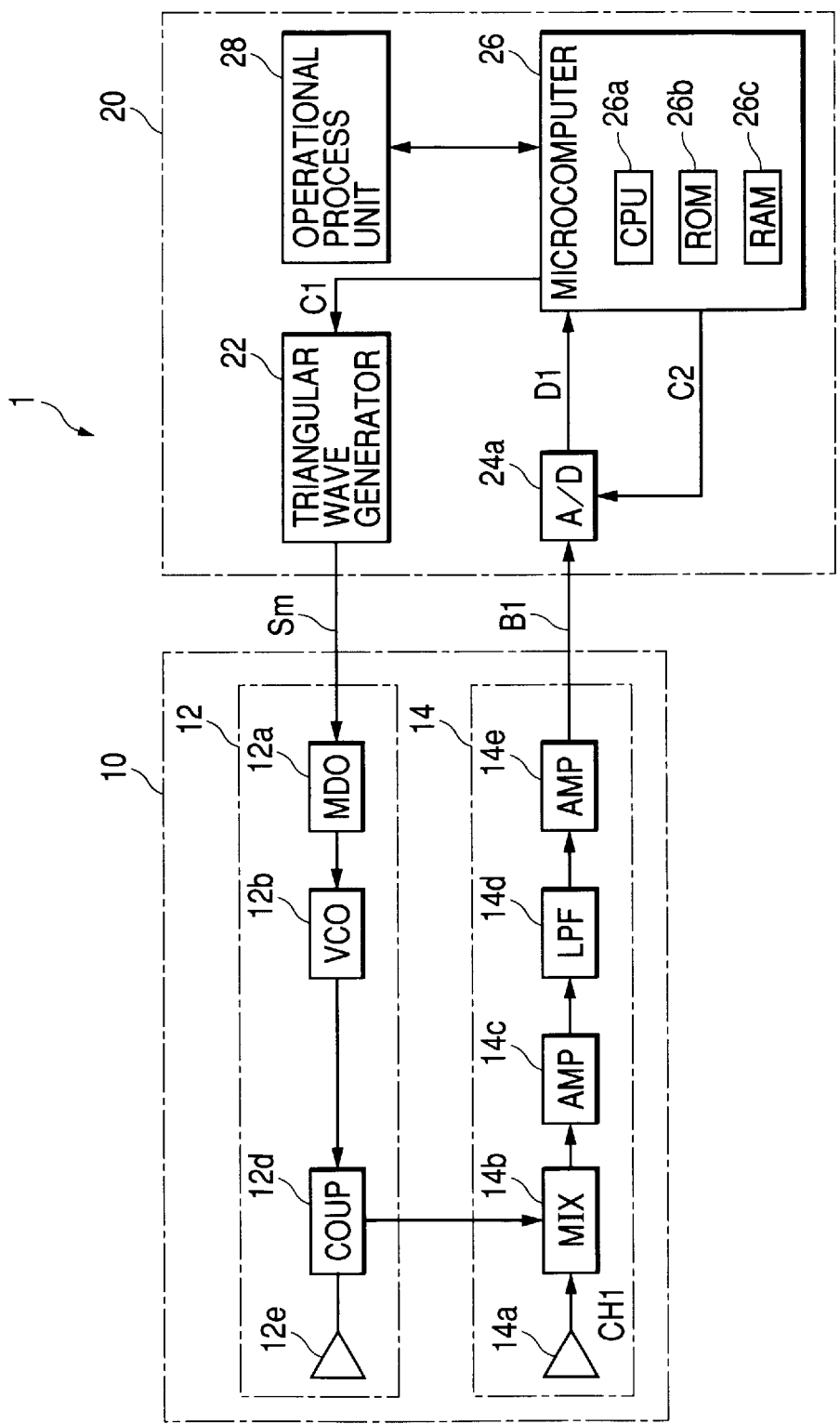
FIG. 2 is a block diagram for illustrating an entire structure of a FMCW apparatus in accordance with one embodiment of the invention.

FIG. 2 is a block diagram for illustrating an entire structure of a FMCW (frequency modulated continuous wave) apparatus 1 in accordance with one embodiment of the invention. The FMCW apparatus 1 includes a transmitting and receiving unit 10 for transmitting and receiving radar waves, and a signal process unit 20 connected to the transmitting and receiving unit 10 for executing process of detecting an object. The signal process unit 20 provides a modulating signal Sm to and receives a beat signal B1 from the transmitting and receiving unit 10. The unit 10 includes a transmitter 12 for transmitting to an object (not shown) radar waves modulated at a predetermined frequency according to the modulating signal Sm, and a receiver 14 for receiving the radar waves reflected by the object.

The transmitter 12 includes a modulator 12a connected to the signal process unit 20 for converting the modulating signal Sm to a predetermined level, a VCO (voltage controlled oscillator) 12b connected to the modulator 12a for generating high frequency signals of a millimeter wave band, a coupler 12d connected to the VCO 12b for distributing a transmission signal from the VCO 12b and generating a local signal, and a transmission antenna 12e connected to the coupler 12d for radiating radar waves according to the transmission signal. The transmission antenna 12e is mechanically scanned to a car width to designate a direction of an object ahead.

The receiver 14 includes a receiving antenna 14a for receiving the radar waves radiated by the transmission antenna 12e and reflected back by the object, a mixer 14b connected to the receiving antenna 14a and the coupler 12d for mixing a reception signal from the receiving antenna 14a with the local signal from the coupler 12d, a pre-amplifier 14c connected to the mixer 14b for amplifying an output signal from the mixer 14b, a low pass filter (LPF) 14d connected to the pre-amplifier 14c for eliminating unnecessary higher frequency components of an output of the pre-amplifier 14c and deriving a beat signal that is a frequency difference between the transmission signal and reception signal, and a post-amplifier 14e connected to the LPF 14d for amplifying the beat signal to a predetermined signal level.

The signal process unit 20 has a microcomputer 26, a triangular wave generator 22 connected to the microcomputer 26 for generating the modulating signal Sm of triangular wave in response to a control signal C1, an analog to digital converter (A/D converter) 24a connected to the microcomputer 26 for converting the beat signal B1 from the receiver 14 to digital data D1 in response to a control signal C2, and an operational process unit 28 connected to the microcomputer 26 for executing operation of the Fast Fourier Transform (FFT) under the instructions from the microcomputer 26. The microcomputer 26 includes a CPU (central processing unit) 26a, a ROM (read only memory) 26b, and a RAM (random access memory), sends out the control signals C1 and C2 to activate the triangular wave generator 22 and the A/D converter 24a, respectively, and calculates a distance and a relative speed of an object based on the digital data D1 obtained from the A/D converter 24a. The CPU 26a functions as an object recognition apparatus in the invention.

The embodiment is explained with respect to a system for mechanically scanning radar waves. However, a system for electronically scanning radar waves such as a digital bean forming system (DBF) can also be used.

In a case where a roadside object 300 (corresponding to a stationary object line in the invention) is not recognized, an explanation will be given for a method of judging whether or not a ghost 210 exists. According to one embodiment of the invention, in a detection area, a first area and a second area (called "assumed ghost area" hereinbelow) are designated. The first area is an area where a vehicle running on an adjacent lane at a relative speed with respect to a predetermined vehicle can at least once be detected. The assumed ghost area is defined to be an area that is different from the first area in the detection area. An object not detected in the first area and detected in the assumed ghost area for the first time is judged to be a ghost.

Figure 3:
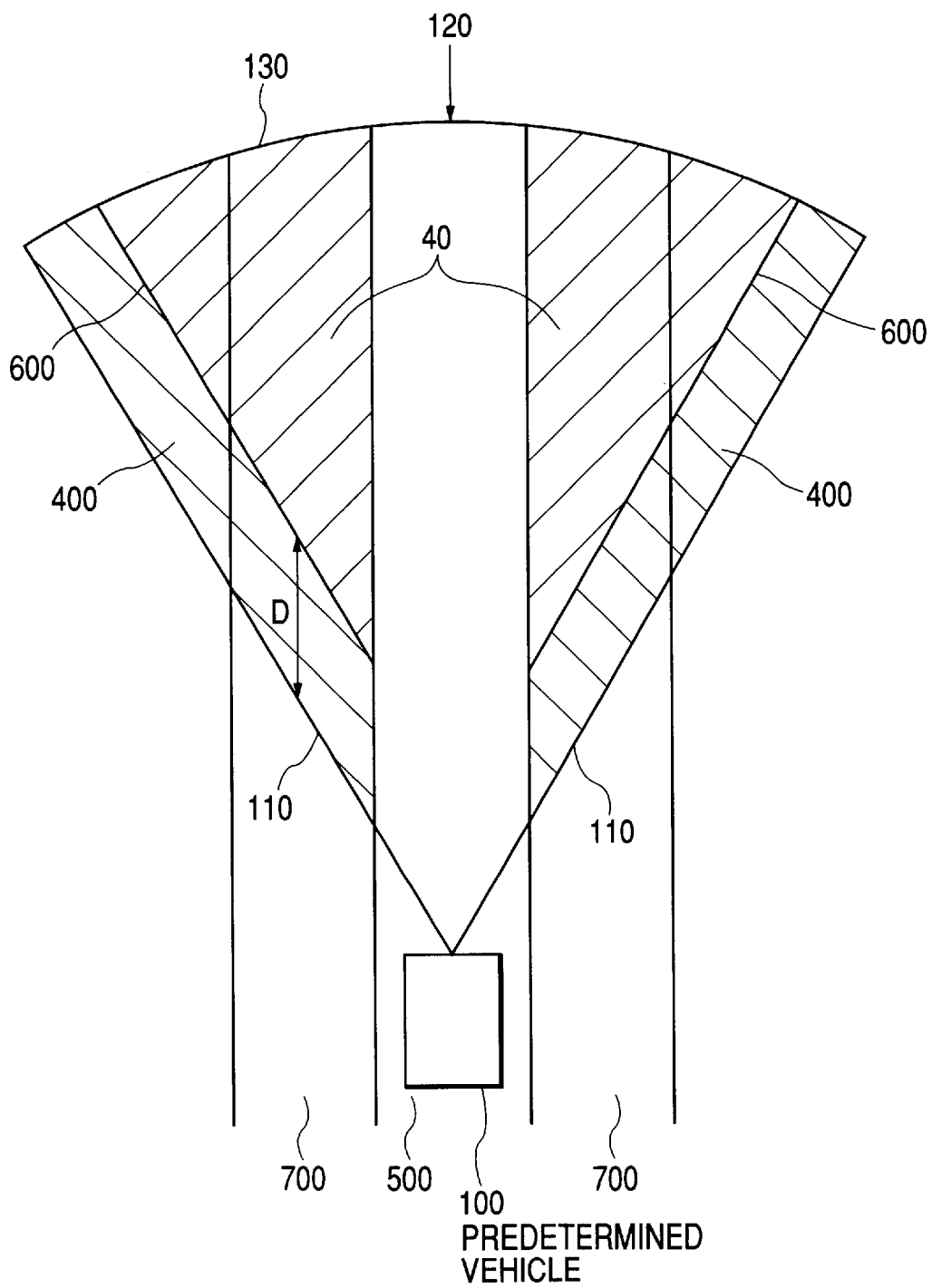
FIG. 3 is a diagram for illustrating how an assumed ghost area is designated in accordance with one embodiment of the invention.

FIG. 3 is a diagram for illustrating how an assumed ghost area is designated in accordance with one embodiment of the invention. A predetermined vehicle 100 having a radar apparatus (not shown) is currently running on a lane 500. There are two adjacent lanes 700 adjacent to the currently running lane 500. The radar apparatus has a detection area 120 where an object can be detected. The detection area 130 has a side boundary 110 and a front boundary 130.

Assuming that the range of speeds detected by the radar apparatus on the predetermined vehicle 100 is given as Vmin to Vmax, and that a period of a detection cycle (control cycle) for detecting an object by the radar apparatus is designated as $\Delta T$, the distance D the predetermined vehicle 100 runs during one period is calculated by $D = Vmax \times \Delta T$.

The detection area 130 includes a first area 400 and an assumed ghost area 40. The first area 400 is defined to be an area enclosed by the side boundary 110 of the detection area 120, the distance D on a boundary between the currently running lane 500 and the adjacent lane 700, a middle boundary 600 parallel to the side boundary 110 by the distance D apart in a traveling direction of the predetermined vehicle 100, and the front boundary 130. The assumed ghost area 40 is an area other than the first area 400 and the currently running lane 500 in the detection area 120.

Maximum relative speeds, usually set with respect to the predetermined vehicle 100, are an ordinal value that vehicles can take. For example, a maximum relative speed can be a difference between a legal maximum speed and a legal minimum speed, and another speed derived by adding to the difference a predetermined speed such as a speed for passing another vehicle. When a navigation system is available that can distinguish roads from freeways, a value to be set can be variable on a road or a freeway.

The first area 400 mentioned above is set to judge whether or not adjacent lanes 700 are existent. That is, when an adjacent lane 700 is existent, an object detected on the adjacent lane 700 is usually detected once in the first area 400. This is because the first area 400 is designated as an area where a vehicle running at a maximum relative speed with respect to the predetermined vehicle can be detected once during one detection cycle. Therefore, when an object is detected in the assumed ghost area 40 for the first time, not detected in the first area 400, it is judged that adjacent lanes 700 are not existent. In spite of the fact that adjacent lanes 700 are not existent, when an object like a vehicle is detected in the assumed ghost area 40, the object is decided to be a ghost.

To improve an accuracy of ghost judgment, not deciding that all the object detected for the first time in the assumed ghost area 40 are a ghost, only when a target vehicle 200 is present that runs at the same distance and relative speed as the object, the object may be judged as a ghost 210.

FIGS. 4–7 are flowcharts of the process for judging a ghost mentioned above in accordance with the embodiment of the invention. The flowcharts are executed at a control cycle of 100 msec by the CPU 26a of the microcomputer 26.

Figure 4:
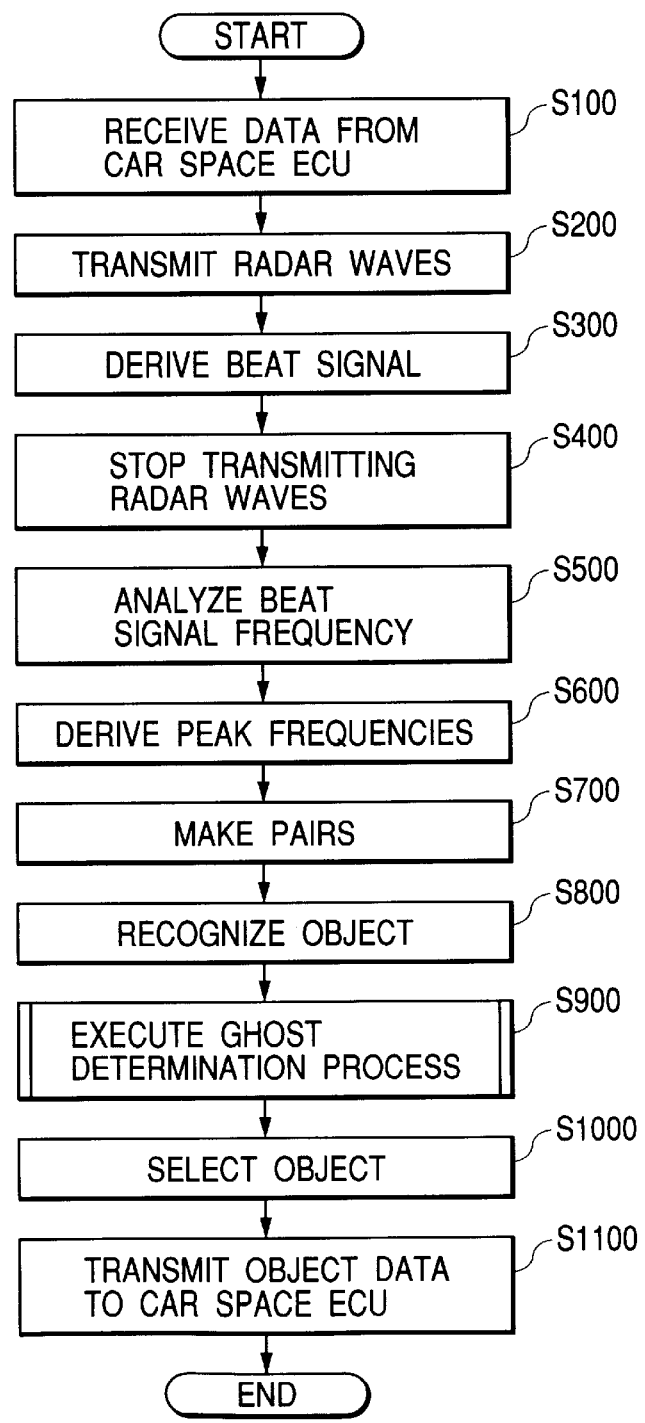
FIG. 4 is a flowchart of entire process in accordance with the embodiment of the invention.

FIG. 4 is a flowchart of the entire process in accordance with the embodiment of the invention. Referring to FIG. 4, process of recognizing an object and transmitting data of a distance and a relative speed to a car space electronic control unit (ECU) (not shown) will be explained. At step 100, data is received from the ECU. The data includes vehicle speed data used for judging whether an object is moving or stationary, and steering angle data used for calculating estimation R.

Step 200, applying the control signal C1 to the triangle wave generator 22 generate a modulating signal Sm, which enables frequency modulated radar waves to be transmitted via the transmission antenna 12e in the transmitter 12.

At step 300, the receiver 14 receives reflected waves from the object ahead to produce the beat signal B1, which is converted to digital data by the A/D converter 24a to be written into the RAM 26c.

At step 400, applying the control signal C1 to the triangle wave generator 22 is stopped, which stops sending frequency modulated radar waves.

In step 500, the beat signal B1 is applied to the operation process unit 28 where frequency analysis is executed. As a result of the execution, at each of the rising and falling portions of the frequency modulated radar waves, a complex vector is obtained for each frequency.

At step 600, based on the absolute values of the complex vectors, that is, the amplitudes of the frequency components of the complex vector, all of the frequency components are detected that show a peak on frequency spectra. The frequency is designated as a peak frequency.

At step 700, a peak frequency regarded as reflected waves from the same object is designated among the peak frequencies of the rising and falling portions obtained at step 600. Since making pairs is the same as before, no particular explanation of it is given.

At step 800, based on peak frequencies of the rising and falling portions designated at step 700, a distance, a relative frequency and a position of the object are calculated to recognize the object.

At step 900, with regard to the object designated, ghost determination process is executed (a particular explanation will be made hereinbelow).

At step 1000, an object is selected for car space control (space means room between cars). As a method of selection, estimate R is calculated from steering angle data to obtain probabilities of the currently running lane. The object having a higher probability should be selected.

At step 1100, the distance, the data of the relative frequency and the position of the object selected are transmitted to the ECU.

Figure 5:
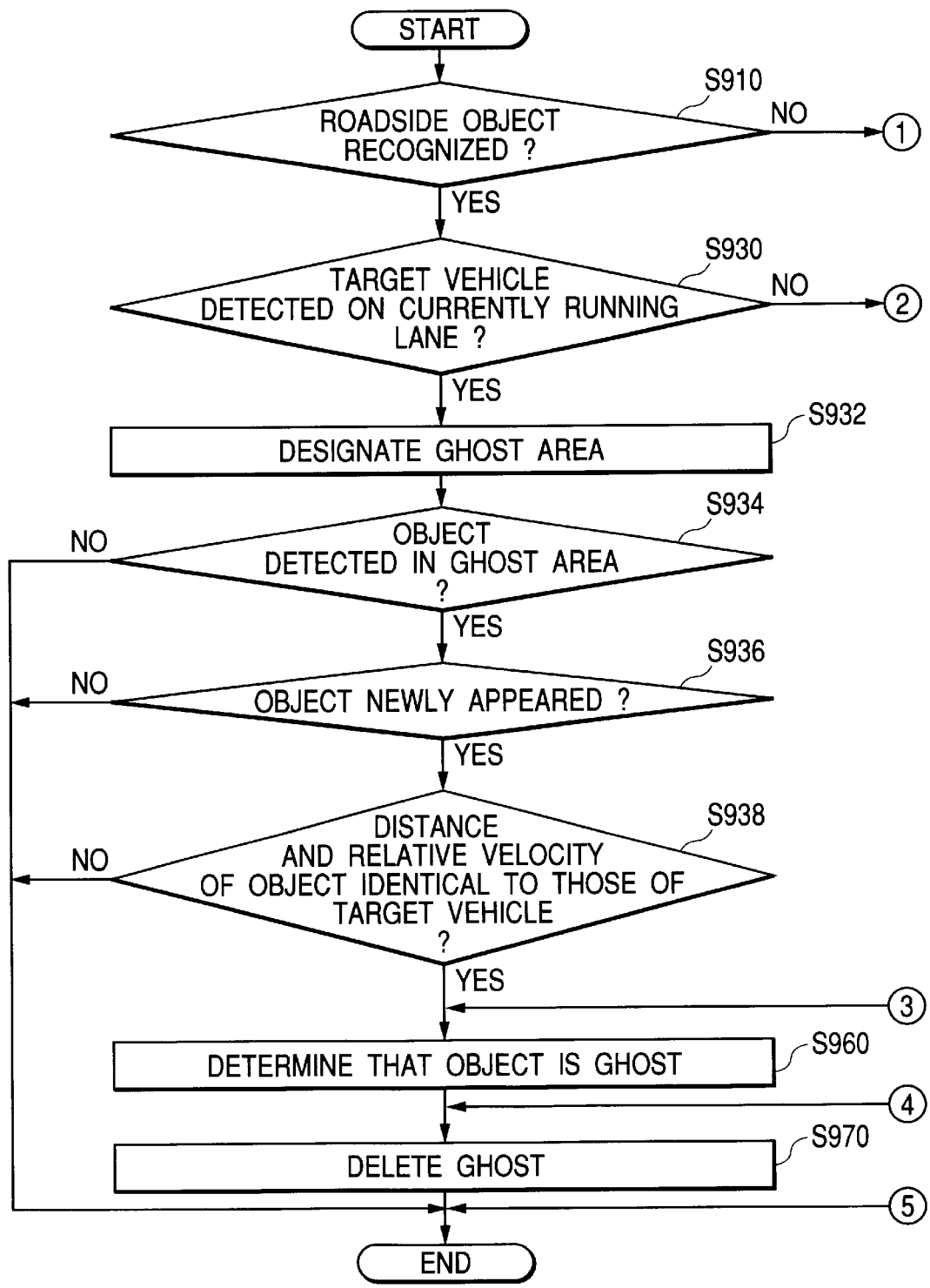
FIG. 5 is a flowchart of ghost judgment process when a roadside object is recognized.
Figure 6:
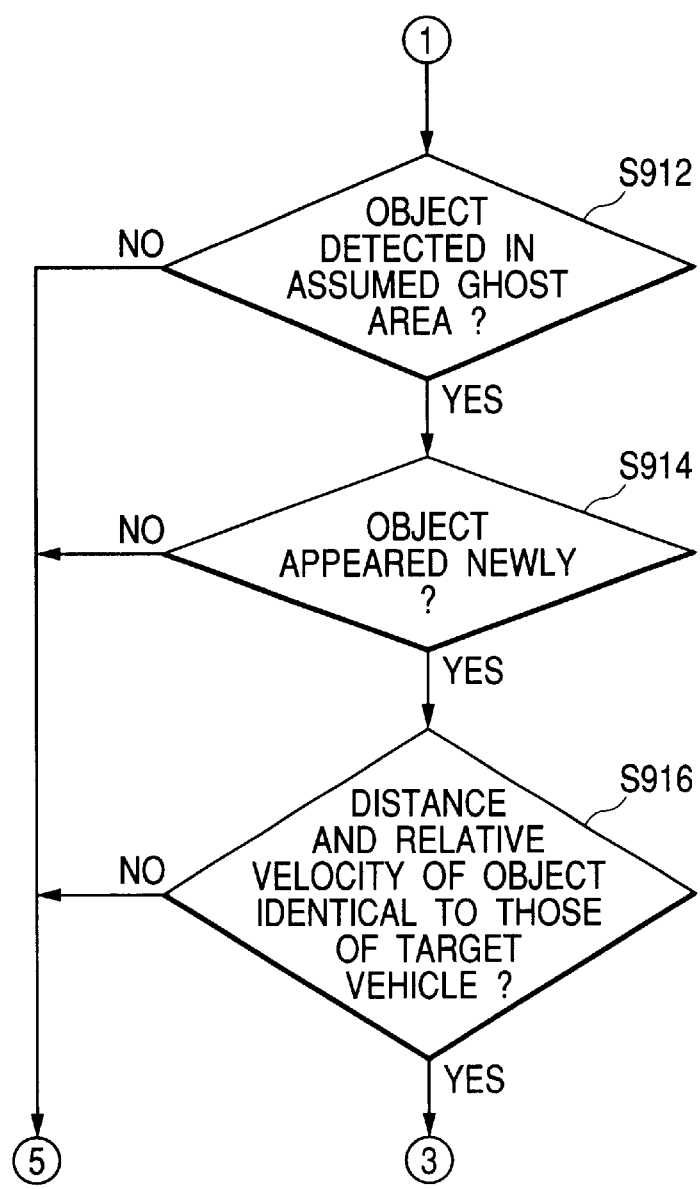
FIG. 6 is a flowchart of ghost judgment process when a roadside object is not recognized.
Figure 7:
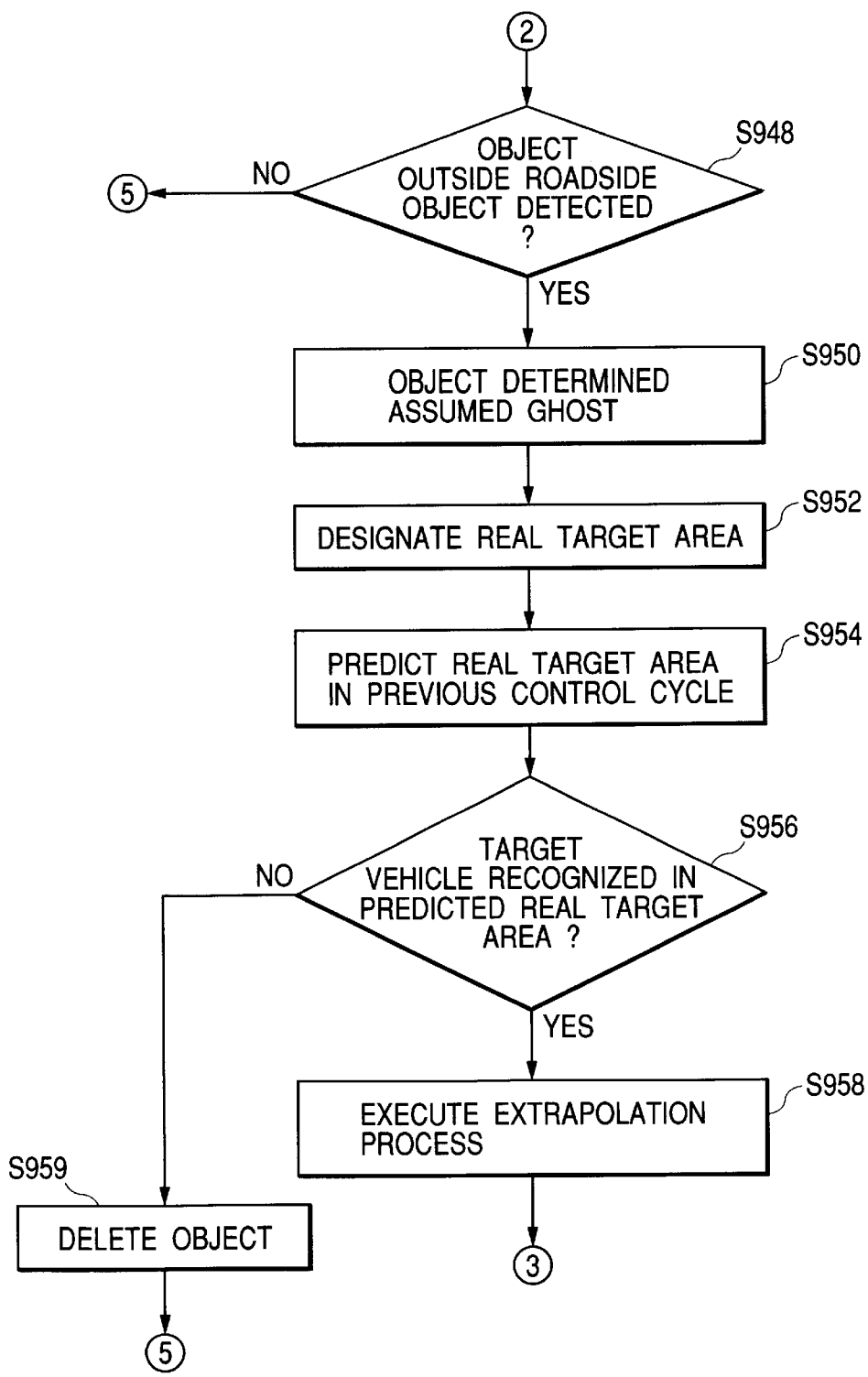
FIG. 7 is a flowchart of extrapolation process when a target vehicle is lost.

FIGS. 5–7 will be used to explain a subroutine for ghost judgment process of step 900. At step 910, it is judged whether or not the roadside object 300 is recognized. When three or more of a series of projections positioned on a guardrail are detected, it is judged that the roadside object 300 is recognized. When it is judged that the roadside object 300 is not recognized, the process goes to ①.

FIG. 5 is a flowchart of the ghost judgment process when the roadside object 300 is recognized. The process of ① shows whether or not an object is the ghost 210 when the roadside object 300 is not recognized. At step 912, it is judged whether or not an object is detected in the assumed ghost area 40 designated beforehand. When it is judged that the object is detected, the procedure goes to step 914.

At step 914, it is judged whether or not the object detected in the assumed ghost area 40 is a newly appeared object. That is, when the object is detected for the first time in the assumed ghost area 40 without being detected in the first area 400, it is judged that a new object has appeared, which is followed by step 916.

At step 916, it is judged whether or not a distance and a relative velocity of the new object are identical to those of the target vehicle 200, which is defined to be a vehicle to be controlled as a subject of car space control where the space means room between cars. The judgment is performed because when a new object is the ghost 210, it always runs at the same distance and relative velocity of the target vehicle 200. When it is judged that the distance and the relative velocity of the new object are identical to those of the target vehicle 200, the procedure goes to ③, where at step 960 the new object is judged to be the ghost 210. Then the procedure goes to step 970 where the ghost 210 is deleted.

When any one of steps 912–916 is judged to be negative, the procedure goes to ⑤ to end the subroutine.

At step 910, when it is judged that the roadside object is detected, the procedure proceeds to step 930, where it is judged whether or not the target vehicle 200 is detected on the currently running lane 500. When it is judged that the target vehicle 200 is detected on the currently running lane 500, the procedure proceeds to step 932.

Figure 8:
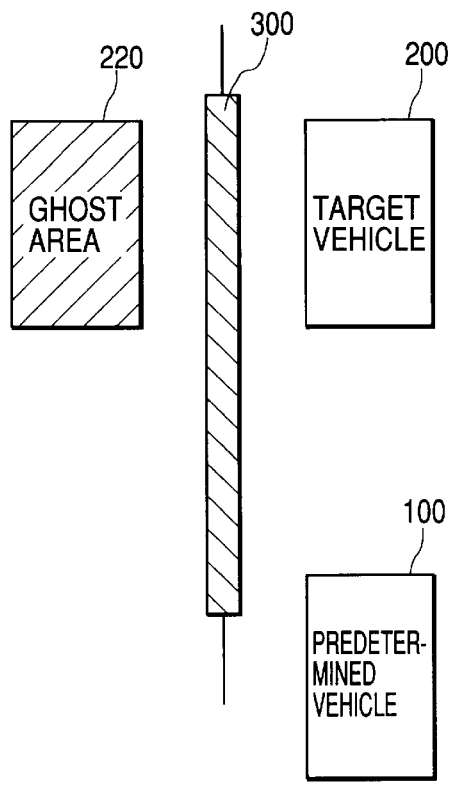
FIG. 8 is a diagram for illustrating how a ghost area is designated.

FIG. 8 is a diagram for illustrating how a ghost area 220 is designated. At step 932, the ghost area 220 is designated as shown in FIG. 8. The ghost area 220 is defined as an area larger than one vehicle by a predetermined amount positioned at a position symmetrical to the target vehicle 200 around the roadside object 300.

At step 934, it is judged whether or not an object is found in the ghost area 220. At step 936, it is judged whether or not the object has newly appeared in the ghost area 220. At step 938, it is judged whether or not the distance and the relative velocity of the object are identical to those of the target vehicle 200. When all of steps 934–938 are judged to be affirmative, at step 960 it is determined that the object is the ghost 210, followed by step 970 where the ghost 210 is deleted. On the other hand, any one of steps 934–938 is judged to negative, the subroutine ends.

At step 930, when it is judged that the target vehicle 200 is not existent on the currently running lane 500, the procedure goes to ②.

FIG. 7 is a flowchart of extrapolation process when the target vehicle 200 is not detected although the ghost 210 is detected. The procedure at ② starts the extrapolation process. The extrapolation process is necessary because since reflection intensity from the roadside object 300 is larger than that from the target vehicle 200, peaks of the FFT power spectra of the waves reflected from the target vehicle 200 are buried in the FFT power spectra of the waves reflected from the roadside object 300. Accordingly, the extrapolation process should be executed as explained below.

At step 948, it is judged whether or not an object is detected outside of the roadside object 300. When it is judged that an object is not detected outside of the roadside object 300, the procedure proceeds to ④, where the subroutine ends. When, on the contrary, it is judged that an object is detected outside of the roadside object 300, the procedure proceeds to 950.

At step 950, it is determined that the object detected outside of the roadside object 300 is an assumed ghost. Here the object is determined to be an assumed ghost, not a ghost, because since the target vehicle 200 does not exist that runs with the object detected outside of the roadside object 300, it can not be distinguished whether the object is the ghost 210 or a noise.

Figure 9:
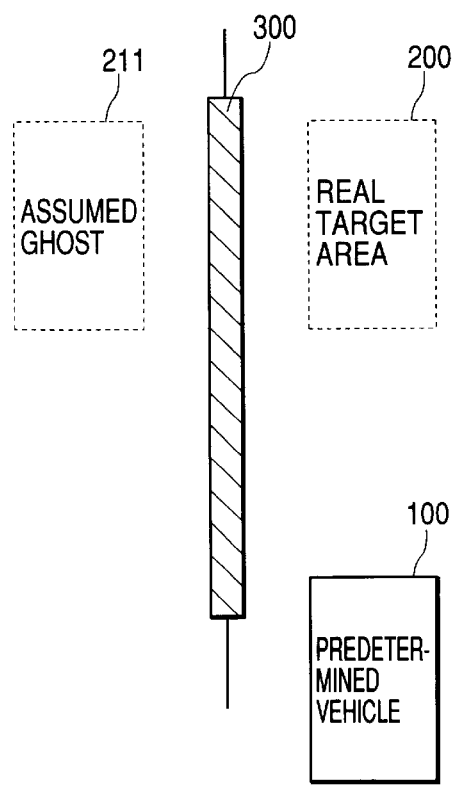
FIG. 9 is a diagram for illustrating how a real target area is designated when a target vehicle is lost.

FIG. 9 is a diagram for illustrating how a real target area 230 is designated when the target vehicle 200 is lost. At step 952, the real target area 230 is designated based on an assumed ghost 211 as shown in FIG. 9. At step 954, an area of the real target area 230 in a previous control cycle is calculated.

At step 956, it is judged whether or not the target vehicle 200 is detected in the predicted real target area 230 during the previous control cycle. That is, when position data, etc. of the target vehicle 200 recognized during the previous control cycle are stored in the RAM 26c, it is judged whether or not the target vehicle 200 is recognized in the predicted real target area 230. When it is judged that the target vehicle 200 is recognized in the predicted real target area 230, the extrapolation process should be executed since the target vehicle 200 is lost.

At step 958, a distance and a relative velocity of the target vehicle 200 during a present control cycle are estimated based on the distance and the relative velocity of the target vehicle 200 during the present control cycle. The target vehicle 200 having the estimated distance and relative velocity is established in the real target area 230 (extrapolation process), followed by step 960. Moreover, the relative speed for the extrapolation process, when an acceleration of the target vehicle 200 during the previous control cycle is known, is estimated based on the acceleration. In addition, the distance and the relative velocity during the previous control cycle may be estimated for extrapolation as the distance and the relative velocity of the lost target vehicle 200. The distance and the relative velocity of the assumed ghost 211 may also be estimated for extrapolation as the distance and the relative velocity of the lost target vehicle 200.

At step 960, the object judged as the assumed ghost 211 is determined as a real ghost 210, followed by step 970 where the ghost 210 is deleted.

At step 956, on the contrary, when it is judged that the target vehicle 200 is not recognized in the real target area 230 during the previous control cycle, the procedure goes to step 959 where the assumed ghost 211 is deleted as a noise, not the ghost 210. The procedure goes to ⑤ to end the subroutine.

According to the embodiments of the invention, an object, which is detected for the first time in the assumed ghost area 40, not in the first detection area 400 established beforehand, may be deleted as a ghost 210, if the object runs at the same distance and relative speed as those of the target vehicle 200. As a result, a false detection of a ghost 210 can be prevented, without recognizing a roadside object 300.

In a case where it is judged that a roadside object 300 is detected, a ghost area 220 is established outside of (adjacent to a currently running lane) a roadside object 300. When an object is newly detected in the ghost area 220 and runs at the same distance and relative speed as those of a target vehicle 200, the object is judged as a ghost 210 to be deleted. As a result, a false detection of a ghost 210 can be prevented.

Even if only a ghost 210 is detected, when a target vehicle 200 is recognized in a predicted real target area 230 during a previous control cycle, extrapolation process should be executed. Accordingly, the target vehicle 200 can be detected without fail.

A first area 400 as mentioned before is shown in FIG. 3. However, the shape of the first area 400 is not limited to the one in FIG. 3. That is, the shape of the first area 400 can be any shape, as long as the first area can be established which is outside of a currently running lane 500 and in which a vehicle running at a maximum relative velocity with respect to a predetermined vehicle 100 can be detected during one control cycle.

Figure 10:
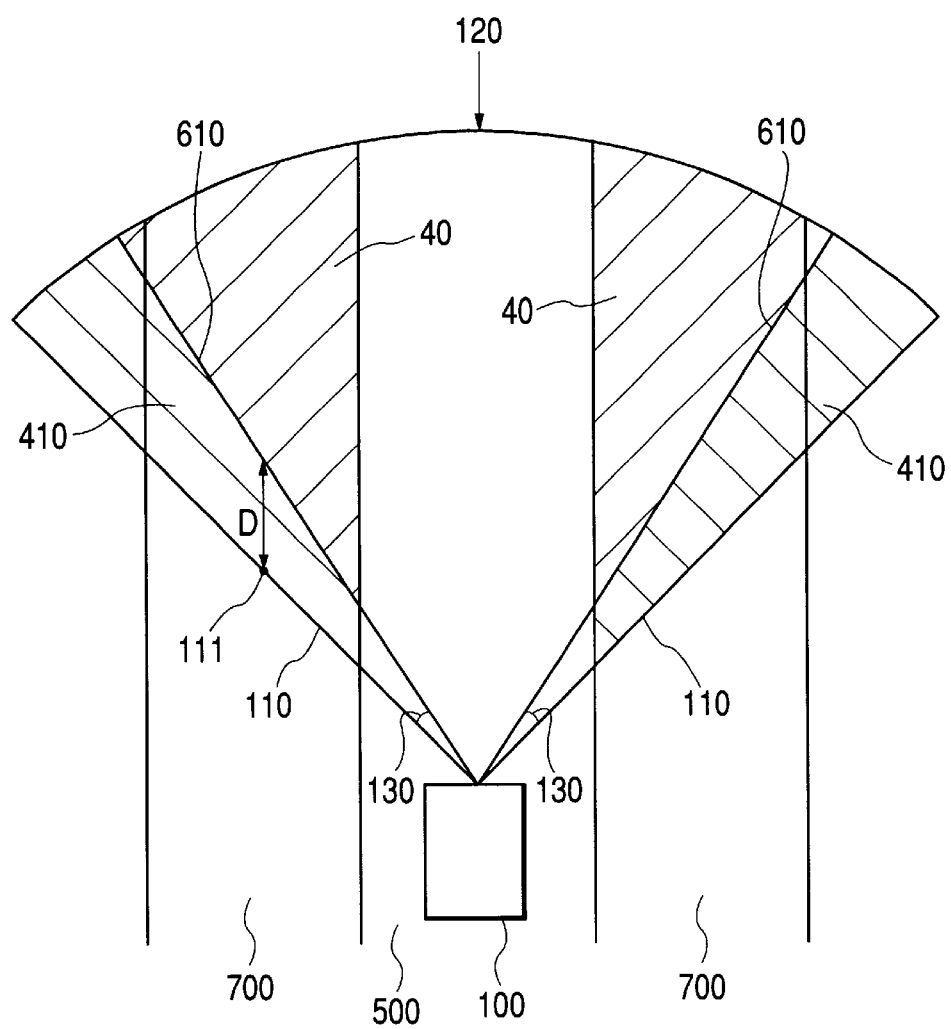
FIG. 10 is a diagram for illustrating how an assumed ghost area is designated.

FIG. 10 shows a second example of the shape of a first area. There are provided a side boundary 110 of a detection area 120, and a middle boundary 610 that make a predetermined angle 130 with the side boundary 110. A first area 410 is an area enclosed by the side boundary 110, the middle boundary 610, and an edge portion of the detection area 120. The middle boundary 610 is defined to pass a point away from a center 111 of an adjacent lane (the center 111 is a position away from a center of a predetermined vehicle 100 by a lane width) by the distance D to a traveling direction of the predetermined vehicle 100. An assumed ghost area is shown by reference numeral 40.

Figure 11:
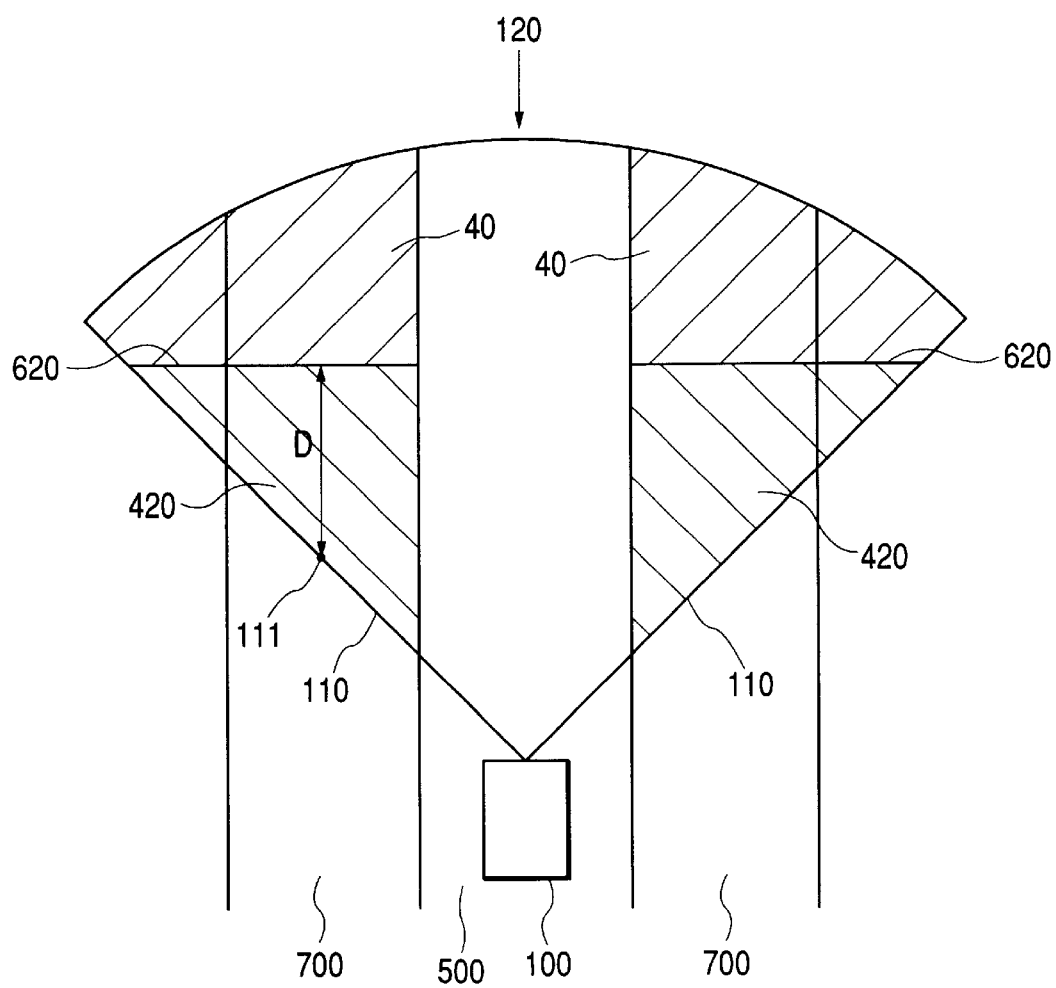
FIG. 11 is a diagram for illustrating how another assumed ghost area is designated.

FIG. 11 shows a third example of the shape of a first area. A center point 111 is in an adjacent lane on a side boundary 110 of a detection area 120. A middle boundary 620 is drawn vertically to a currently running lane 500 through a position away from the center point 111 by the distance D. A first area 420 is defined to be an area enclosed by the side boundary 110, the middle boundary 620, and the currently running lane 500. An assumed ghost area is shown by reference numeral 40.

Figure 12:
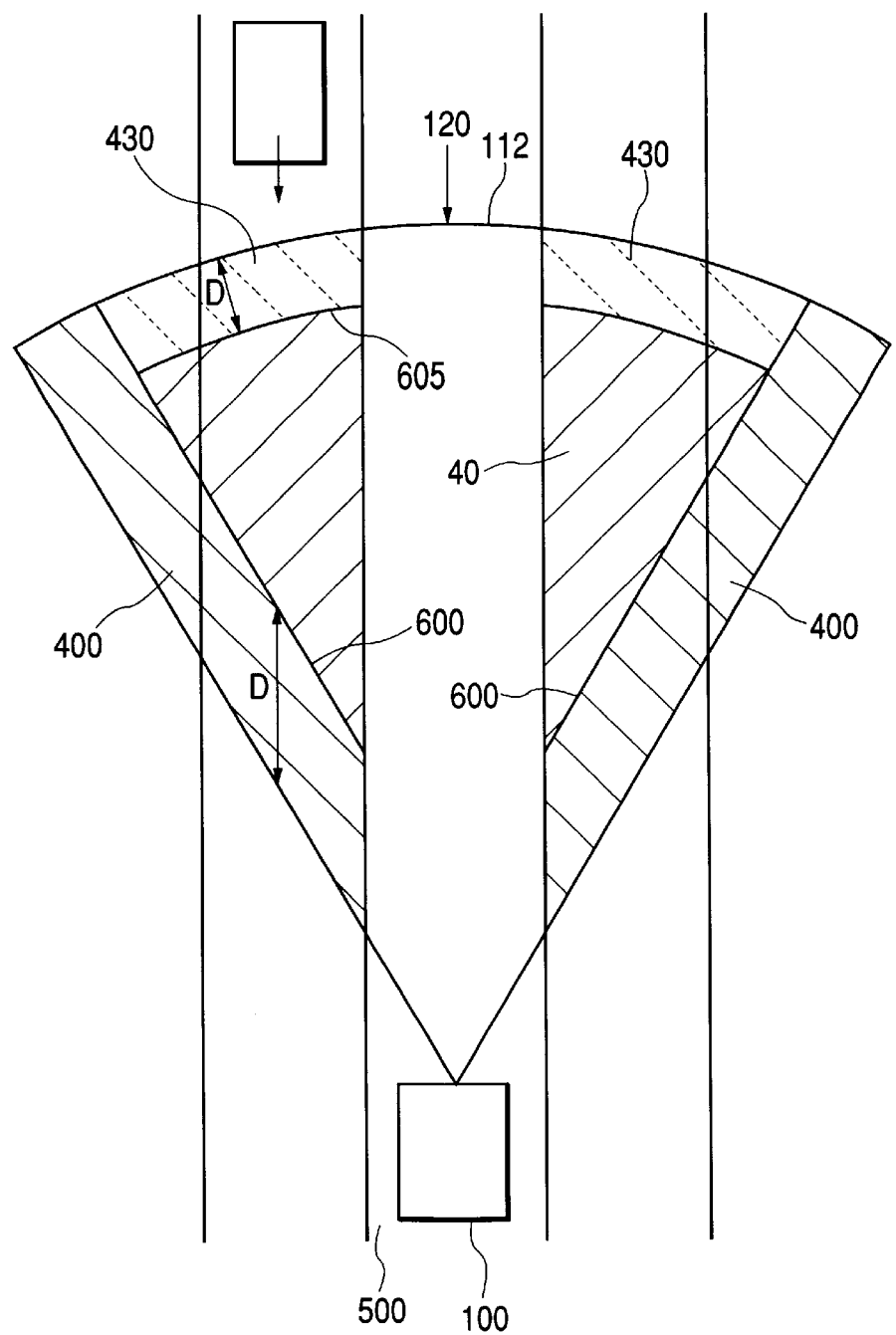
FIG. 12 is a diagram for illustrating how still another assumed ghost area is designated.

FIG. 12 shows a fourth example of the shape of a first area. In FIGS. 3, 10 and 11 when a vehicle running on the adjacent lane 700 outside of the detection area 120 comes into the detection area 120, a vehicle is detected for the first time in the assumed ghost area 40. Therefore, a vehicle that is really existent tends to be judged a ghost. Accordingly, as shown in FIG. 12, a first area 430 can be established in a front portion of the detection area 120. The first area 430, for example, is set as an area enclosed by a front boundary 112 of the detection area 120, a parallel boundary 605 shifted in parallel to the front boundary 112 by the distance D, a middle boundary 600, and a currently running lane 500.

A first area and an assumed ghost area may be established on one side of a currently running lane. For example, as for roads in Japan, since ghosts tend to appear on a left side of the currently running lane, an assumed ghost area may be set only on the left side of a currently running lane. As for roads in the United States, on the contrary, an assumed ghost area may be set only on the right side of a currently running lane. In addition, a first area and an assumed ghost area may be established only in a region on an adjacent lane adjacent to a currently running lane.

When only a ghost 210 is detected and a target vehicle 200 is not detected, there is another extrapolation process other than the flowchart shown in FIG. 7, by which, during a previous control cycle, a predicted position from the target vehicle 200 in recognition to the target vehicle 200 to a present control cycle is calculated beforehand, and the extrapolation process may be executed if the predicted position is in a real target area 230. The method brings about the same advantages as those of the embodiments described above.

According to the flowchart shown in FIG. 5, in order to judge with certainty whether or not an object is a ghost 210, when an object newly discovered in a ghost area 220 runs at the same distance and relative speed as those of a target vehicle 200, the object is judged as a ghost 210 that is to be deleted. However, when an object is found outside of a roadside object 300, the object may be deleted without other judgment. This is because the probability is high that an object found outside of the roadside object 300 is a ghost 210 or noise.

The embodiments of the invention are related to a FMCW apparatus to which an object recognition apparatus is applied. The embodiments can be applied to a car space warning apparatus that notifies a driver of the existence of a vehicle that approaches the driver and shortens the car space, and a collision alleviation apparatus that varies the operation of an air bag in accordance with a vehicle ahead.

Although described above in connection with the particular embodiments of the invention, it should be understood that the descriptions of the embodiments are illustrative of the invention and are not intended to be limiting. Various modifications and applications may occur to those skilled in the art without departing from the true spirit and scope of the invention as defined in the appended claims.

What is claimed is:

1. An object recognition apparatus, comprising:
   a judgment unit for judging whether an object is detected on a lane other than a lane on which a predetermined vehicle is currently running;
   an adjacent lane judgment unit for judging whether an adjacent lane exists adjacent to the currently running lane; and
   a recognition unit for recognizing that the object is a virtual image when the judgment unit has judged that the object is detected and the adjacent lane judgment unit has judged that the adjacent lane does not exist.

2. The object recognition apparatus as recited in claim 1, wherein the adjacent lane judgment unit designates a first area where a vehicle running on the adjacent lane at a predetermined relative speed with respect to the predetermined vehicle is detected at least once, and a second area that is outside of the currently running lane and does not overlap the first area, and when the object is detected for the first time in the second area, not in the first area, judges that the adjacent lane is not existent.

3. The object recognition apparatus as recited in claim 2, wherein when a first object has been detected in the second area for the first time, not detected in the first area, but a second object having the same distance and relative speed as the first object has not been detected on the currently running lane, the recognition unit does not recognize the first object as a virtual image.

4. The object recognition apparatus as recited in claim 1, further comprising a stationary object line judgment unit for judging whether a stationary object line is detected having a plurality of stationary objects, wherein when the stationary object line judgment unit has judged that the stationary object line is detected, the recognition unit recognizes as a virtual image an object detected outside of the stationary object line.

5. The object recognition apparatus as recited in claim 4, wherein when a virtual image is detected outside of the stationary object line, but a vehicle ahead is not detected that runs on the currently running lane at the same distance and relative speed as the virtual image, the recognition unit estimates a distance and a relative velocity of the vehicle ahead based on the virtual image.

6. The object recognition apparatus as recited in claim 5, wherein the recognition unit estimates a distance and a relative velocity of the virtual image as the distance and the relative velocity of the vehicle ahead.

7. The object recognition apparatus as recited in claim 5, wherein the recognition unit designates an area, based on the distance and the relative velocity of the virtual image, where the vehicle ahead is estimated to exits in the past, and, when the vehicle ahead is detected in the designated area, estimates a distance and a relative velocity of the vehicle ahead during a present control cycle, based on the distance and the relative velocity of the vehicle ahead detected in the past.

8. A radar apparatus for use on a vehicle, comprising:
   a transmitter for transmitting waves to an object ahead;
   a receiver for receiving the waves reflected by the object;
   a judgment unit, based on a signal from the receiver, for judging whether the object is detected on a lane other than a lane on which the vehicle is currently running;
   an adjacent lane judgment unit for judging whether an adjacent lane exists adjacent to the currently running lane; and
   a recognition unit for recognizing that the object is a virtual image when the judgment unit has judged that the object is detected and the adjacent lane judgment unit has judged that an adjacent lane does not exist.

9. A method of recognizing an object, comprising:
   judging whether an object is detected on a lane other than a lane on which a vehicle is currently running;
   judging whether an adjacent lane exists adjacent to the currently running lane; and
   recognizing that the object is a virtual image when the object is detected and the adjacent lane does not exist.

10. A method of recognizing an object by the use of a radar apparatus on a vehicle, comprising:
    transmitting waves to an object ahead;
    receiving the waves reflected by the object;
    based on a signal from the receiver, judging whether the object is detected on a lane other than a lane on which the vehicle is currently running;
    judging whether an adjacent lane exists adjacent to the currently running lane; and
    recognizing that the object is a virtual image when the judgment unit has judged that the object is detected and the adjacent lane judgment unit has judged that an adjacent lane does not exist.

11. A method of recognizing an object by the use of a radar apparatus on a vehicle that can detect a range of velocities and have a detection period, comprising:
    establishing a detection area in a traveling direction of the vehicle that is currently running on a lane, for detecting an object by radar waves of the radar apparatus;
    establishing a first area within the detection area on an adjacent lane adjacent to the currently running lane, the first area designated by a distance decided by a maximum velocity of the detection range and the detection period;
    establishing a second area within the detection area, not overlapping the first area; and
    detecting the object for the first time in the second area, not in the first area,
    whereby the object is judged to be a ghost.

12. The method as recited in claim 11, wherein the distance is decided by multiplying the maximum velocity of the detection range by the detection period.

13. A method of recognizing an object by the use of a radar apparatus on a vehicle that can detect a range of velocities and have a detection period, comprising:

establishing a detection area in a traveling direction of the vehicle that is currently running on a lane, for detecting an object by radar waves of the radar apparatus;

establishing a first area within the detection area on an adjacent lane adjacent to the currently running lane, the first area designated by a distance decided by a maximum velocity of the detection range and the detection period;

establishing a second area within the detection area, not overlapping the first area;

detecting the object for the first time in the second area, not in the first area; and detecting a target vehicle that runs at the same distance and relative velocity of those of the object, whereby the object is judged to be a ghost.

14. The method as recited in claim 13, wherein the distance is decided by multiplying the maximum velocity of the detection range by the detection period.